United States Patent [19]
Hansen

[11] Patent Number: 5,360,308
[45] Date of Patent: Nov. 1, 1994

[54] VEHICLE DUMPING APPARATUS WITH PULSATING PLATFORM AND MOVABLE HINGE

[76] Inventor: Lyle A. Hansen, 3620 Amick Ave., Des Moines, Iowa 50310

[21] Appl. No.: 69,164

[22] Filed: May 28, 1993

[51] Int. Cl.⁵ .............................................. B65G 67/40
[52] U.S. Cl. .................................... 414/363; 414/582; 414/786; 414/415
[58] Field of Search ................................ 414/362–365, 414/367, 415, 420, 575, 577, 579, 580, 582, 786

[56] References Cited

U.S. PATENT DOCUMENTS

| | | | |
|---|---|---|---|
| 1,126,392 | 1/1915 | Chinnock | 414/367 |
| 1,530,337 | 3/1925 | Wickland | 414/364 |
| 1,968,624 | 7/1934 | Trapp | 414/583 |
| 2,282,621 | 5/1942 | Thompson | 414/385 |
| 2,284,226 | 5/1942 | Oglesby | 414/375 X |
| 2,523,212 | 9/1950 | Hight | 414/375 X |
| 2,793,767 | 5/1957 | Smith et al. | 414/583 |
| 2,953,262 | 9/1960 | Murphy | 414/364 |
| 3,118,550 | 1/1964 | Hansen | 414/362 |
| 3,400,770 | 9/1968 | Matson | 414/375 X |
| 3,574,332 | 4/1971 | Wetzel | 414/363 |
| 3,920,135 | 11/1975 | Wetzel | 414/363 |
| 4,999,021 | 3/1991 | Reissman | 414/363 X |

FOREIGN PATENT DOCUMENTS

| | | | |
|---|---|---|---|
| 898864 | 6/1962 | United Kingdom | 414/364 |
| 117422 | 2/1959 | U.S.S.R. | 414/363 |

*Primary Examiner*—David A. Bucci
*Attorney, Agent, or Firm*—Zarley, McKee, Thomte, Voorhees, & Sease

[57] ABSTRACT

A truck platform is elevated at one end and then moved rearwardly by pulsation cylinders which slowly accelerate and then rapidly decelerate the platform and truck. The abrupt deceleration causes the material in the truck to continue to move rearwardly separating from the truck floor and move out of the truck in a stair step fashion through repeating pulsations. The angle in which the platform needs to be raised is minimized by the application of pulsation forces to the system thereby improving the safety and ease of unloading the truck.

22 Claims, 6 Drawing Sheets

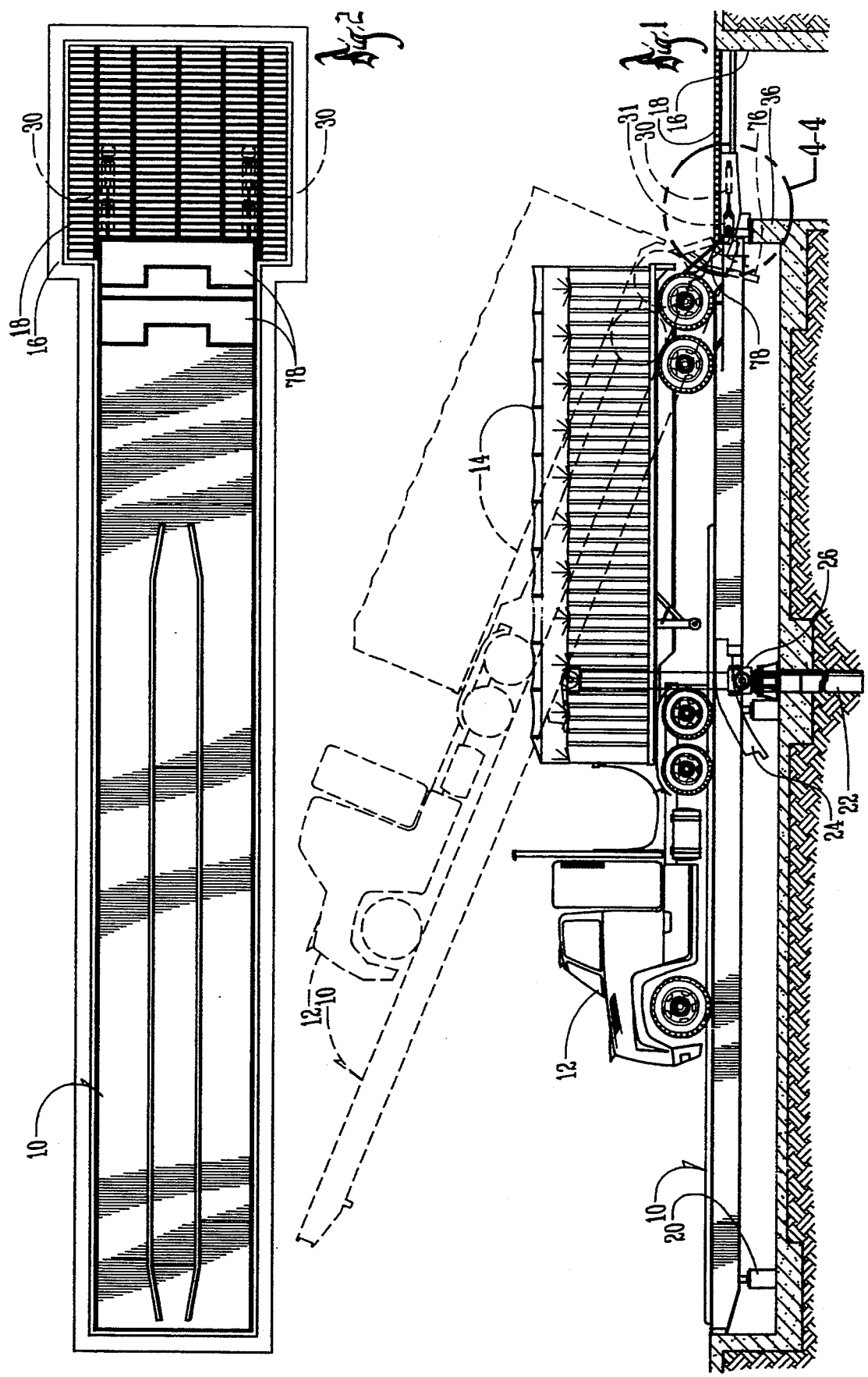

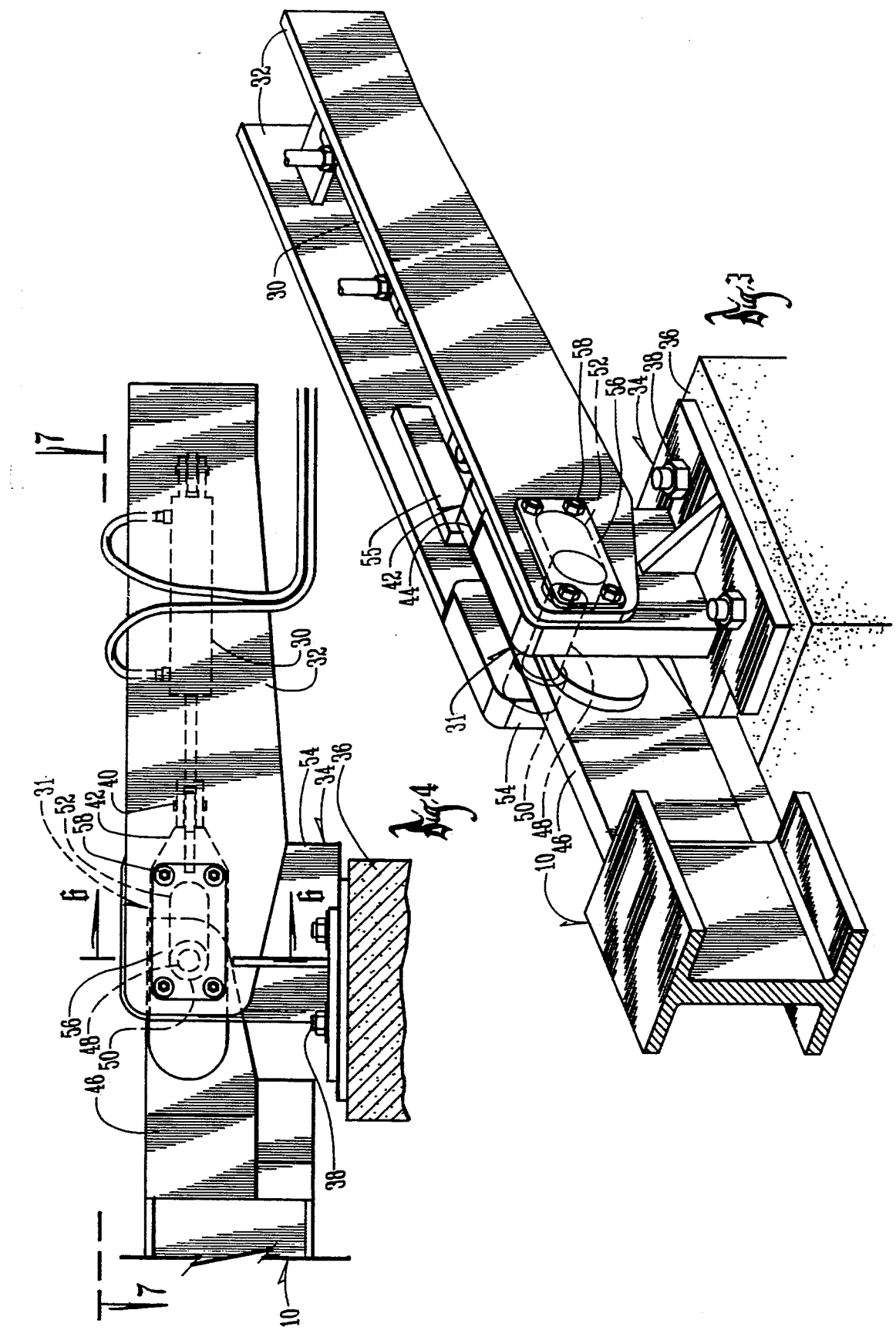

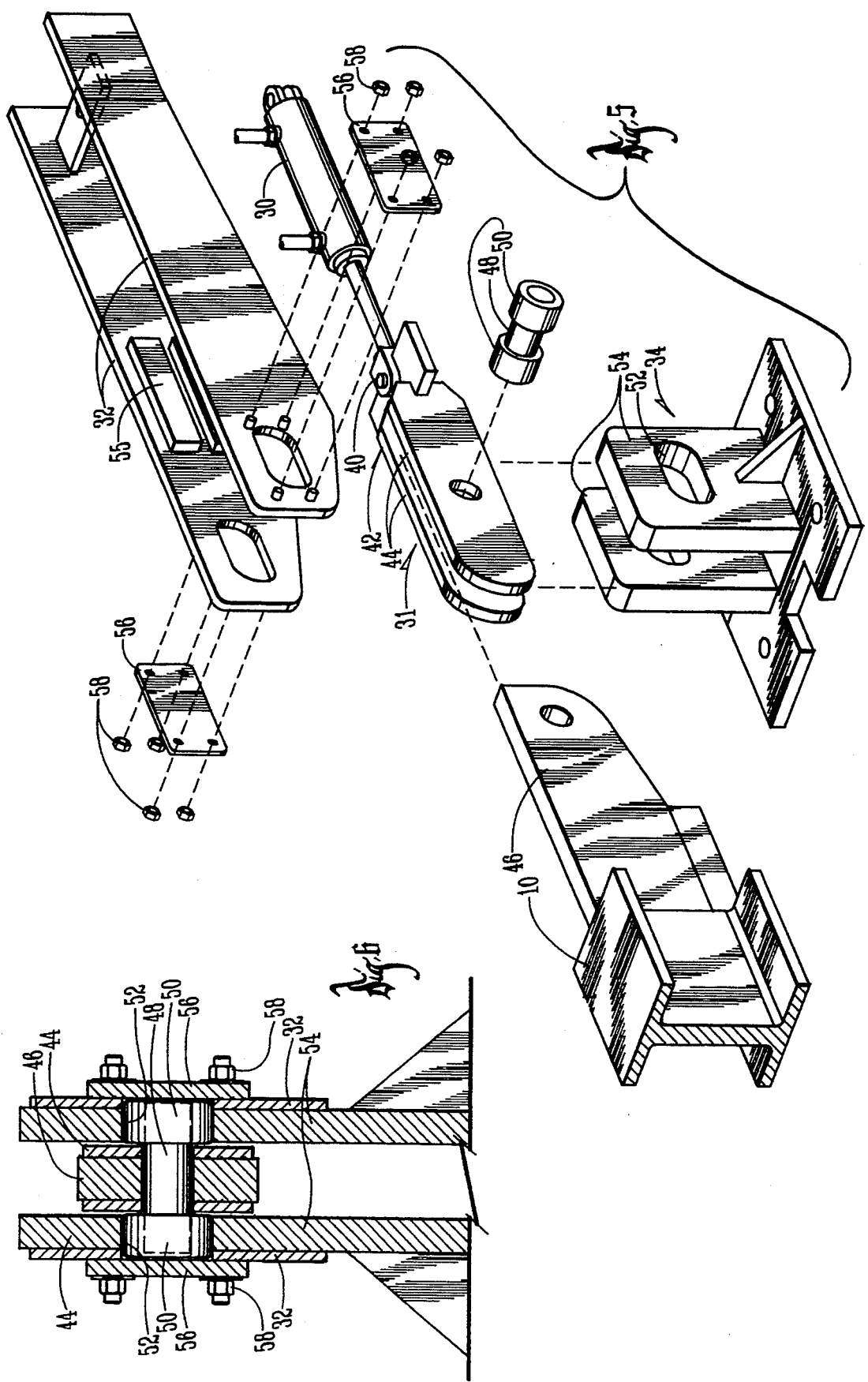

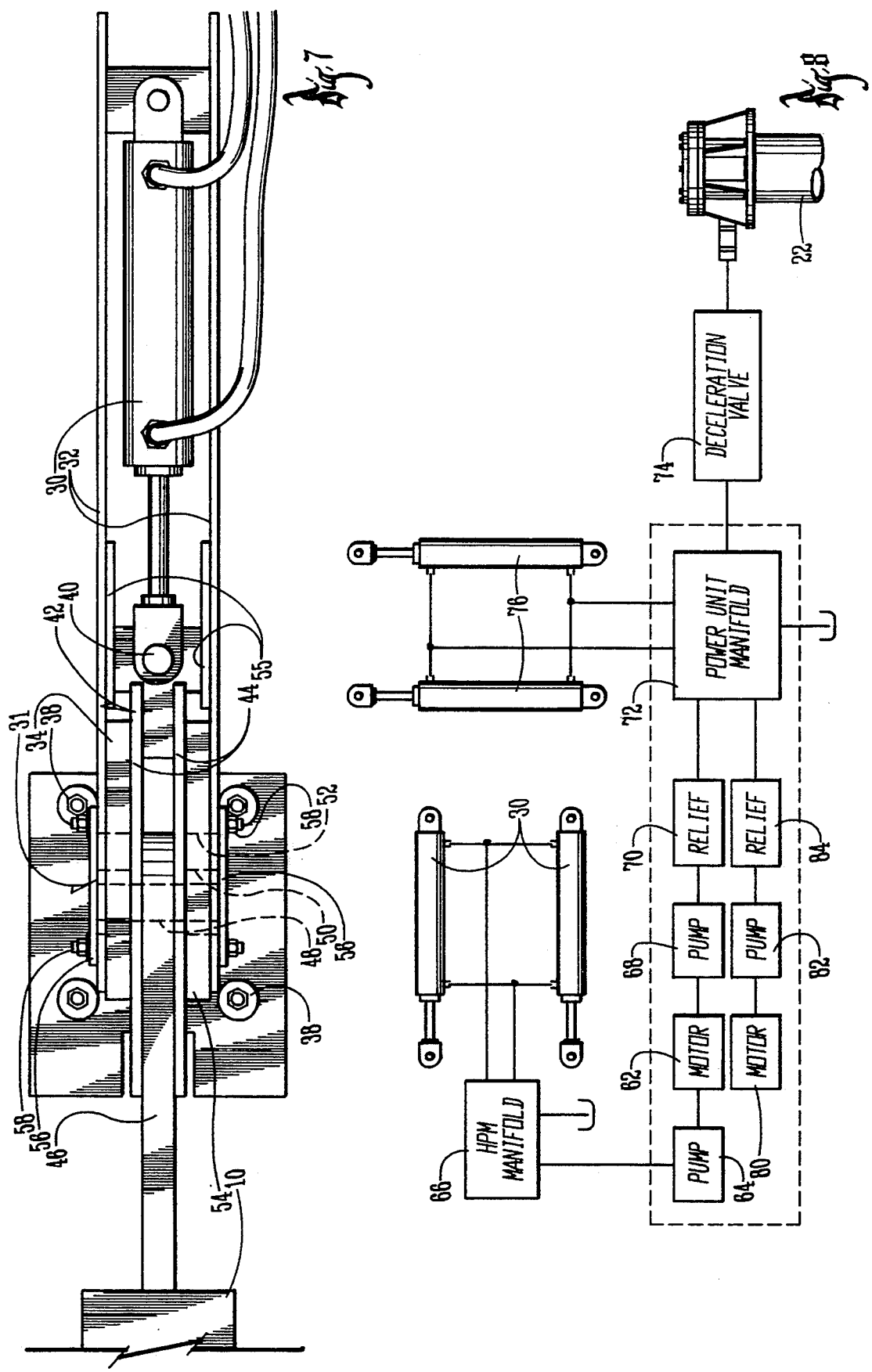

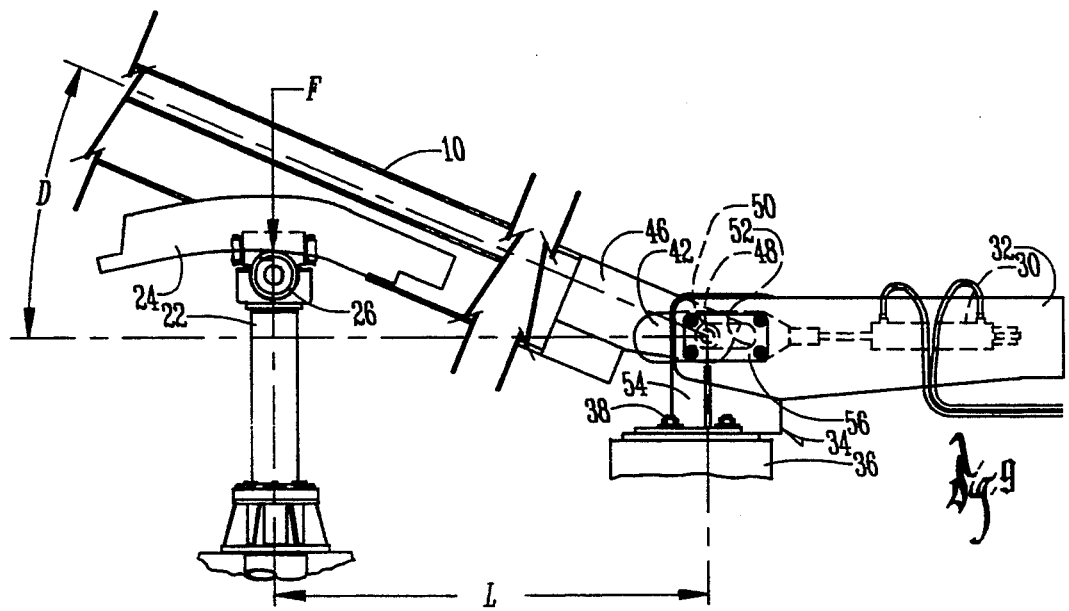
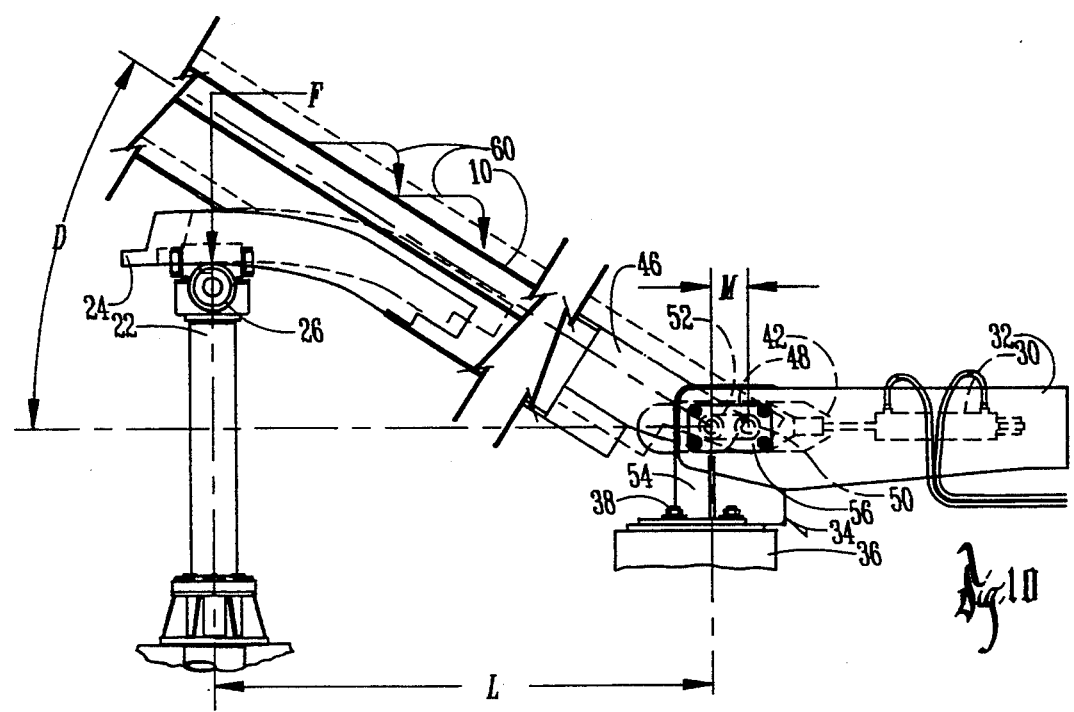

VEHICLE DUMPING APPARATUS WITH PULSATING PLATFORM AND MOVABLE HINGE

BACKGROUND OF THE INVENTION

The vehicle dumping apparatus of my U.S. Pat. No. 3,118,550, Jan. 21, 1964, has been very successful in the grain industry. It involves a grain truck on a platform elevated at one end by a fixed vertical cylinder which has a roller on its upper end in engagement with a curved track on the bottom side of the platform. The curved track is positioned such that the substantial downward pressure from the platform and truck is along the vertical axis of the cylinder thus minimizing horizontal forces on the cylinder which would tend to flex or bend it.

Other industries receive materials that can be very difficult to unload such as ear corn, wood chips, refuse, etc. These must be tilted too high and dangerous tilt angles to get the loads to break loose. When the material does begin to move, it can come down in one uncontrolled mass, at times damaging equipment and causing injury. Vibratory devices have been connected directly to the truck to shake it in an effort to loosen the material. The patent to R. W. Oglesby U.S. Pat. No. 2,284,226, May 26, 1942, is one example. This device, however, is not suitable for use with a truck raised at one end by an elevated platform. Thus, what is needed is a pulsation device that will move the platform and the truck as a unit while elevated at approximately a 30° angle.

SUMMARY OF THE INVENTION

This invention contemplates breaking the material in the truck box loose through the combined influence of an elevated platform and truck at approximately 30° and horizontal pulsations being applied to the platform and in turn the truck to take advantage of the inertial and gravitational forces at work on the material tending to slide it to the rear end of the truck and then into a receiving pit.

A pair of hydraulic cylinders, one on each side, is connected through a rolling hinge to the platform for reciprocating it within the limits of a stationary stop. A preferred cycle of operation is utilized wherein the pulsation cylinders move the platform and truck rearwardly with increasing velocity for a distance of approximately 3 inches at which point the movement is quickly stopped hydraulically by the pulsation cylinders. The material continues to move rearwardly and downwardly as a result of inertia and gravity in a stair step fashion as the cycle is repeated. A pause between cycles is introduced to avoid any harmonic movements.

This system allows effective unloading of the truck without raising the truck to dangerously high angles. The angle of elevation and frequency of pulsation will depend on the material in the truck and how flowable it is. The distance the platform will travel will vary up to approximately 6 inches with the platform elevated up to approximately 35°. The maximum load on the hinge connections between the pulsation cylinders and the platform will be approximately 40,000 pounds.

For example, using 5 inch diameter pulsation cylinders the cylinder pressure during braking is not expected to exceed 2,000 PSI and this will give up to 40,000 pounds of force at each hinge. Typically, a rearward force of 10,000 pounds through a distance of 3 inches will produce a rearward velocity of 2 miles per hour on a truck weighing 80,000 pounds. Braking with a force of 40,000 pounds at each hinge stops the movement in 0.12 seconds in a distance of 0.4 inches. For that short period of time, it is equivalent to having the load tilted almost vertically.

It is seen that by moving the truck rearwardly and abruptly stopping it, the load tends to lift from the floor of the truck and is carried backward by its momentum and inertia. As the pulsation cycle is repeated, the material in the truck will step its way out of the truck into the pit. The truck is held firmly by its own weight against a suitable backstop and/or wheel stops at the lower end of the platform.

DESCRIPTION OF THE DRAWINGS

FIG. 1 is a side elevation view of a truck on a platform shown in raised and lowered positions.

FIG. 2 is a top plan view thereof.

FIG. 3 is a perspective view of the hinge connection between the pulsation cylinder and the rear end of the platform.

FIG. 4 is a side elevational view thereof taken along line 4—4 in FIG. 1.

FIG. 5 is an exploded perspective view of the connection between the pulsation cylinder and the rear end of the platform.

FIG. 6 is a cross sectional view of the hinge connection between the pulsation cylinder and the rear end of the platform taken along line 6—6 in FIG. 4.

FIG. 7 is a top plan view thereof taken along line 7—7 in FIG. 4.

FIG. 8 is a hydraulic schematic of the hydraulic circuitry for operation of the system.

FIG. 9 is a fragmentary side elevation view of the platform during raising with the platform in the forward position.

FIG. 10 is a view similar to FIG. 9 but showing the platform in the forward position in preparation to move rearward where as it slowly accelerates and then quickly decelerates resulting in the material being unloaded to momentarily break free from the truck and move rearward of the truck.

DESCRIPTION OF PREFERRED EMBODIMENT

Figure 11:
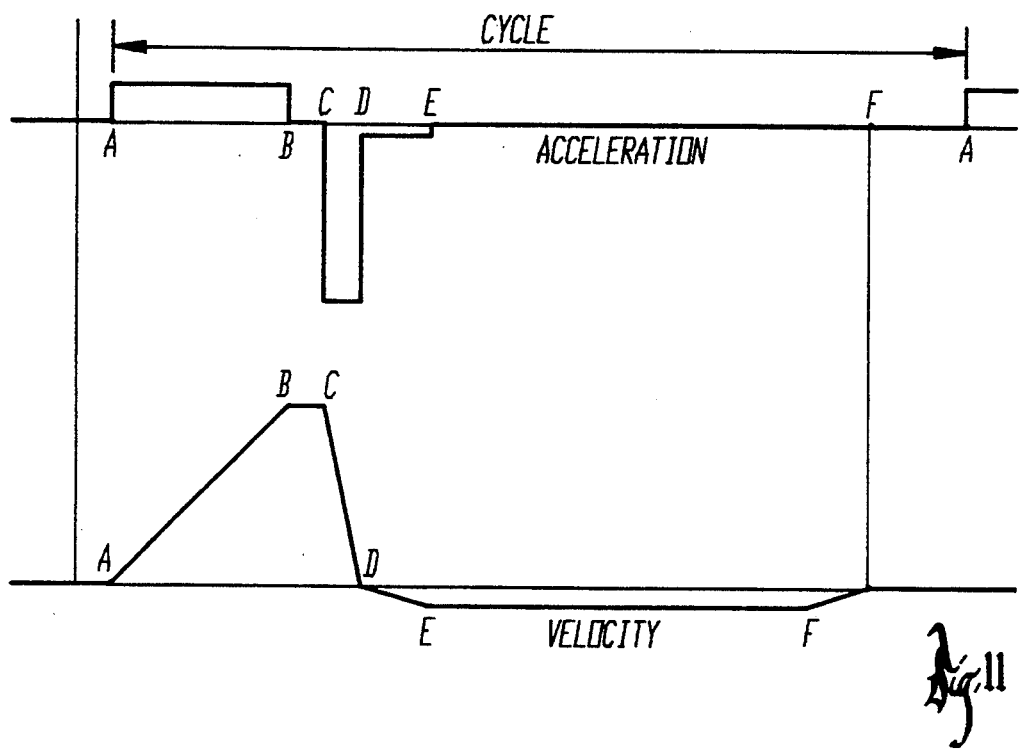
FIG. 11 is a graph of one complete pulsation cycle illustrating changes in velocity and acceleration.

The vehicle platform of this invention is referred to generally in FIG. 1 by the reference numeral 10 and is seen having a truck 12 with a trailer 14 positioned to unload bulk material into a receiving pit 16 through a slatted floor 18. The forward end of the platform 10 is supported by a stationary support 20 and a fixed vertical cylinder 22 engages the platform approximately midway for raising it to the dash line position shown in FIG. 1. The details of the vertical cylinder 22 and its engagement with a curved track assembly 24 as seen in FIGS. 9 and 10 are more fully described in my U.S. Pat. 3,118,550. Briefly, the cylinder 22 includes a roller 26 at its upper end which engages the curved tracks 24 such that the substantial forces on the cylinder are along its vertical axis thus minimizing horizontal forces which would tend to flex or bend the cylinder.

The rearward end of the platform is connected to a pair of laterally spaced apart pulsation cylinders 30 by a rolling hinge assembly 31 as seen in FIGS. 1 and 5. As seen in FIGS. 3 and 5 the pulsation cylinders 30 are connected at one end to a pair of spaced apart plates 32 which in turn are connected to an upstanding hinge base 34 anchored to a foundation 36 by bolts 38. The forward end of the cylinder 30 is connected through a pin 40 to a clevis 42 having side plates 44. Pin 48 pivotally connects an ear member 46 extending rearwardly from the platform 10 to side plates of 44. Pin 48 extends past side plates 44 to receive rollers 50. The rollers 50 travel in slots 52 in a pair of spaced apart fixed plates 54. Slots 52 define travel limits. The clevis 42 with side plates 44 is guided horizontally by vertically spaced apart guide plates 55 on plates 32 and by the pin 48 with its rollers 50 traveling in the horizontal slot 52. As seen in FIG. 6, cover plates 56 are secured by bolts 58 to plates 32.

Thus in operation it is seen that the rolling hinge 31 is in the forward position until the desired tilt angle is reached at which time the pulsation cylinders 30 retract, rolling the platform 10 rearwardly on rollers 26 and 50, as illustrated in FIG. 10, from the solid line position to the dashed line position. The pulsation cylinders 30 accelerate the platform 10 and truck rearwardly and then decelerate it abrupty stopping the platform and truck. The material on the bottom of the truck bed, as represented by the arrows 60 in FIG. 10, will tend to stair step down the incline toward the pit 16. Depending on the material in the truck, it may actually move off the floor into temporary suspension while gravity combined with its momentum and inertia moves it downwardly and rearwardly.

Figure 12:
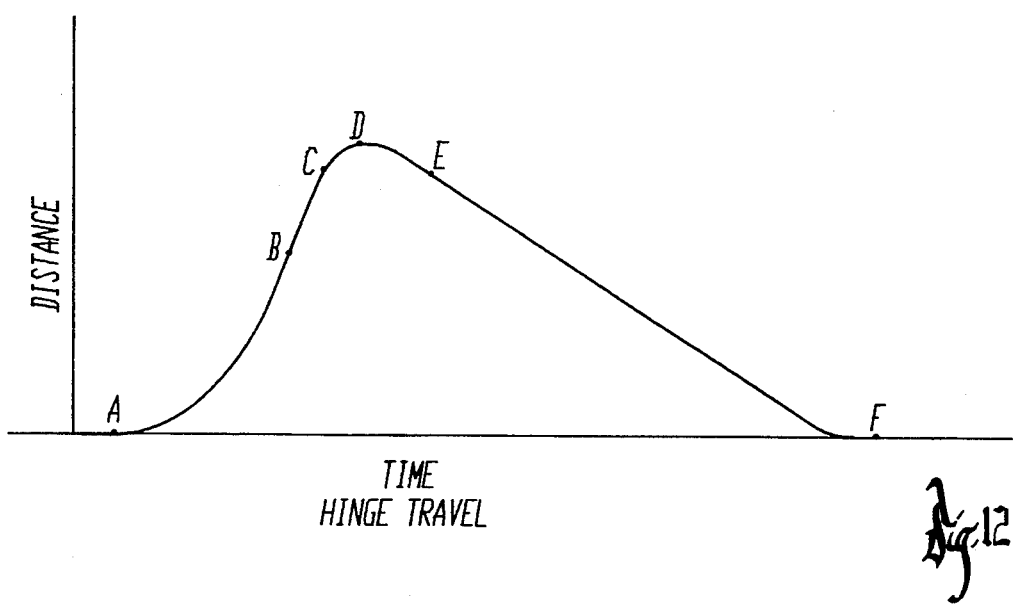
FIG. 12 is a graph illustrating the hinge travel throughout the pulsation cycle.

A more detailed analysis of the pulsation cycle is seen in FIGS. 11 and 12 where backward travel occurs from A to B with a constant acceleration to obtain the desired maximum speed without much material compaction against the tilted floor. Coasting or slight deceleration occurs from B to C during the shifting of the valving to reverse the mechanical tolerance positions. This is intended to lessen the impact loads on the hinge elements and to lessen noise. From C to D there is sudden hydraulic braking of the load to a stop. This is when the material moves relative to the trailer floor and can become airborne if the stop is quick enough and the platform is tilted sufficiently. In conventional unloading, the sine of the tilted angle is a measure of how tilting reduces the resistance factor to discharge. With a load at 30° and a breaking force equal to the weight of the total moving load (load plus truck plus platform), the load will move backward and fall downward after movement of the truck and platform stops. The material stops when its kinetic energy has been absorbed by friction with the truck. From D to E is a return acceleration to produce the constant low return velocity from E to F. At F, there is a pause before starting the next cycle to control the overall discharge rate and avoid harmonics. The hinge travel is illustrated in FIG. 12.

In FIG. 8 it is seen that the pulsation cylinders 30 are operated by a motor 62 connected to a pump 64 in turn connected to a horizontal pulse module (HPM) manifold 66. The motor 62 also drives a pump 68 through a relief valve 70 connected to a manifold 72 in turn connected to a deceleration valve 74 and the vertical cylinder 22. The manifold 72 also supplies power to a pair of backstop cylinders 76 connected to the wheel backstops 78 as seen in FIG. 1. A second motor 80 connected to a pump 82 through a relief valve 84 may be used as a backup or to increase the speed of operation of the backstop cylinder 76 and the vertical cylinder 22. The backstop 78 may be pivoted into the floor of the platform such that the truck may be driven over it.

What is claimed is:

1. A vehicle dumping apparatus comprising,
   a vehicle platform having front and rear ends,
   a hinge means pivotally connecting said rear end to a support,
   a power means engagable with said platform for pivotably raising and lowering said platform front end, and pulsation means connected to said platform for reciprocating said platform when in said raised position, and said pulsation means moving said platform through a cycle of movement which includes movement in a rearward direction, abrupt deceleration, and a return in a forward direction with the time of movement in the rearward direction being less than the time of movement in the forward direction.

2. The structure of claim 1 wherein said pulsation means includes a power cylinder connected to the rear end of said platform for providing said reciprocal platform movement.

3. The structure of claim 2 and said platform has an operative line of travel, and a stop means is provided in the operative line of travel of said platform to abruptly limit platform movement in a rearward direction.

4. The structure of claim 3 wherein said platform in a cycle of operation travels a distance rearwardly and an equal distance forwardly, said stop means includes said power cylinder and a stationary slotted member having a slot with a length, said hinge means includes a pin interconnecting said power cylinder and platform rear end, said pin being received in said slotted member whereby the distance of travel of said platform is limited to the length of said slot.

5. The structure of claim 1 wherein said power means includes a vertical hydraulic cylinder having an upper end with a roller engaging said platform for platform horizontal movement relative to said vertical hydraulic cylinder.

6. The structure of claim 5 and a curved track is provided on said platform for engagement by said roller, said platform creating a load on said vertical hydraulic cylinder which is substantially all vertical throughout the horizontal movement of said platform as said platform is being pulsated.

7. The structure of claim 1 wherein said deceleration is caused by operation of said pulsation means which includes a power cylinder.

8. The structure of claim 1 wherein said reciprocation of said platform includes only horizontal movement of said platform.

9. A vehicle dumping apparatus comprising,
   a vehicle platform having front and rear ends,
   a hinge means pivotally connecting said rear end to a support,
   a power means engagable with said platform for pivotably raising and lowering said platform front end, and
   pulsation means including a power cylinder connected to the rear end of said platform for reciprocating said platform when in said raised position.

10. The structure of claim 9 and said platform has an operative line of travel, and a stop means is provided in the operative line of travel of said platform to abruptly limit platform movement in a rearward direction.

11. The structure of claim 10 wherein said platform travels a distance and said stop means includes said power cylinder and a stationary slotted member having a slot with a length, said hinge means includes a pin interconnecting said power cylinder and platform rear end, said pin being received in said slotted member whereby the distance of travel of said platform is limited to the length of said slot.

12. The structure of claim 9 wherein said pulsation means moves said platform through a cycle of movement which includes acceleration in a rearwardly direction, abrupt deceleration, and a return in a forward direction.

13. The structure of claim 12 wherein said pulsation means causes a pause after said abrupt deceleration and before repeating the cycle.

14. The structure of claim 9 wherein said power means is connected to said platform for horizontal movement of said platform to occur relative to said power means.

15. The structure of claim 14 wherein said power means includes a vertical hydraulic cylinder having an upper end with a roller engaging said platform for platform horizontal movement relative to said vertical hydraulic cylinder.

16. The structure of claim 15 and a curved track is provided on said platform for engagement by said roller, said platform creating a load on said vertical hydraulic cylinder which is substantially all vertical throughout the horizontal movement of said platform as said platform is being pulsated.

17. The structure of claim 9 wherein said deceleration is caused by operation of said power cylinder.

18. The structure of claim 9 wherein said reciprocation of said platform includes only horizontal movement of said platform.

19. A vehicle dumping apparatus comprising,
a vehicle platform having front and rear ends,
a hinge means pivotally connecting said rear end to a support,
a power means engagable with said platform for pivotably raising and lowering said platform front end, and
pulsation means connected to said platform for reciprocating said platform horizontally only when in said raised position.

20. The method of unloading a container on a platform elevated at an angle, including the steps of,
connecting a pulsation means to said platform, and
operating said pulsation means to cause said platform to move through multiple cycles which include movement in a rearward direction followed by abrupt deceleration, and a return in a forward direction, with the time of movement in the rearward direction being less than the time of movement in the forward direction.

21. A container dumping apparatus comprising,
a container platform having front and rear ends,
a hinge means pivotally connecting said rear end to a support,
a power means engagable with said platform for pivotably raising and lowering said platform front end, and
pulsation means connected to said platform for moving said platform horizontally only rearwardly and forwardly relative to said support when in said raised position for moving material rearwardly in a container on said platform for unloading said container.

22. The container dumping apparatus of claim 21 wherein said pulsation means produces a cycle of movement including said rearwardly and forwardly movement, said cycle of movement having forward and rearward ends with an abrupt change in speed of movement occurring at the rearward end of said cycle for causing material in a container to move rearwardly for unloading said container.

* * * * *